US012626993B2

(12) United States Patent
Chen et al.

(10) Patent No.: US 12,626,993 B2
(45) Date of Patent: May 12, 2026

(54) CASE, BATTERY, POWER CONSUMING DEVICE, AND METHOD FOR ASSEMBLING CASE

(71) Applicant: CONTEMPORARY AMPEREX TECHNOLOGY CO., LIMITED, Ningde City (CN)

(72) Inventors: Binbin Chen, Ningde City (CN); Danyue Xue, Ningde City (CN); Qing Wang, Ningde City (CN); Yifeng Chen, Ningde City (CN); Shuai Ren, Ningde City (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 702 days.

(21) Appl. No.: 18/175,476

(22) Filed: Feb. 27, 2023

(65) Prior Publication Data

US 2023/0207946 A1      Jun. 29, 2023

Related U.S. Application Data

(63) Continuation of application No. PCT/CN2021/091336, filed on Apr. 30, 2021.

(30) Foreign Application Priority Data

Aug. 31, 2020   (CN) ......................... 202010901525.8

(51) Int. Cl.
*H01M 50/26* (2021.01)
*H01M 50/202* (2021.01)
(Continued)

(52) U.S. Cl.
CPC ......... *H01M 50/26* (2021.01); *H01M 50/202* (2021.01); *H01M 50/244* (2021.01); *H01M 50/262* (2021.01); *H01M 50/271* (2021.01)

(58) Field of Classification Search
CPC .. H01M 50/262; H01M 50/271; H01M 50/24; H01M 50/204; H01M 50/186; H01M 50/202; H01M 50/244; H01M 50/26
See application file for complete search history.

(56) References Cited

U.S. PATENT DOCUMENTS 9,178,191 B2    11/2015  Park et al.
2012/0114999 A1    5/2012  Park et al.
(Continued)

FOREIGN PATENT DOCUMENTS

CN        205122652 U     3/2016
CN        205248331 U  *  5/2016
(Continued)

OTHER PUBLICATIONS

Notice of Reasons for Refusal received in the corresponding Japanese Application 2022-580063, mailed Jan. 30, 2024.
(Continued)

*Primary Examiner* — Imran Akram
(74) *Attorney, Agent, or Firm* — K&L Gates LLP

(57)          ABSTRACT

A case, a battery, a power consuming device, and a method for assembling a case are provided. The case includes a first case body, an accommodating groove, a sealant, and a second case body. The first case body is provided with an opening. The accommodating groove is provided in a peripheral direction of the opening. The sealant is accommodated in the accommodating groove. The second case body is provided with a peripherally-arranged joint part. The joint part is configured to extend into the accommodating groove and be joined with the sealant when the second case body covers the opening, so as to form a sealed connection between the first case body and the second case body. The accommodating groove can limit the sealant, the sealant does not shift in the accommodating groove, and a sealing (Continued)

failure is less likely to occur, thus ensuring the sealing performance of the sealant.

11 Claims, 13 Drawing Sheets

(51) Int. Cl.
    *H01M 50/244*     (2021.01)
    *H01M 50/262*     (2021.01)
    *H01M 50/271*     (2021.01)

(56)         References Cited

U.S. PATENT DOCUMENTS

| | | |
|---|---|---|
| 2019/0341590 A1 | 11/2019 | Kim et al. |
| 2020/0052252 A1 | 2/2020 | Smith et al. |

FOREIGN PATENT DOCUMENTS

| | | | | |
|---|---|---|---|---|
| CN | 205881954 | U | | 1/2017 |
| CN | 206163565 | U | | 5/2017 |
| CN | 107424145 | A | | 12/2017 |
| CN | 206893641 | U | | 1/2018 |
| CN | 207052642 | U | * | 2/2018 |
| CN | 108172708 | A | † | 6/2018 |
| CN | 208444874 | U | * | 1/2019 |
| CN | 208738328 | U | † | 4/2019 |
| CN | 110828721 | A | | 2/2020 |
| CN | 112331976 | A | | 2/2021 |
| DE | 102013102283 | A1 | | 9/2014 |
| FR | 2973165 | B1 | * | 9/2019 | ............ H01M 50/24 |
| JP | 2011194982 | A | * | 10/2011 | .......... H01M 50/271 |
| JP | 2015156302 | A | | 8/2015 |
| JP | 6065692 | B2 | * | 1/2017 |
| JP | 2019197664 | A | | 11/2019 |
| KR | 20160116566 | A | | 10/2016 |

OTHER PUBLICATIONS

The First Examination Report received in the corresponding Indian Application 202327019094, mailed May 9, 2023.
International Search Report received in the corresponding International Application PCT/CN2021/091336, mailed Jul. 26, 2021.
First Office Action received in the corresponding Chinese Application 202010901525.8.
Written Opinion received in the corresponding International Application PCT/CN2021/091336, mailed Jul. 26, 2021.
Second Office Action received in the corresponding Chinese Application 202010901525.8, mailed Feb. 16, 2023.
Supplementary search report of the corresponding Chinese Application 202010901525.8.
Notification to Grant Patent Right for Invention of the corresponding Chinese Application 202010901525.8.
The extended European search report received in the corresponding European Application 21859668.2, mailed on Jul. 18, 2024.
Grant Notice received in the corresponding Indian Application 202327019094, mailed on Oct. 29, 2024.
Decision to Grant a Patent received in the corresponding Japanese Application 2022-580063, mailed on Jul. 23, 2024.

\* cited by examiner
† cited by third party

1000

100

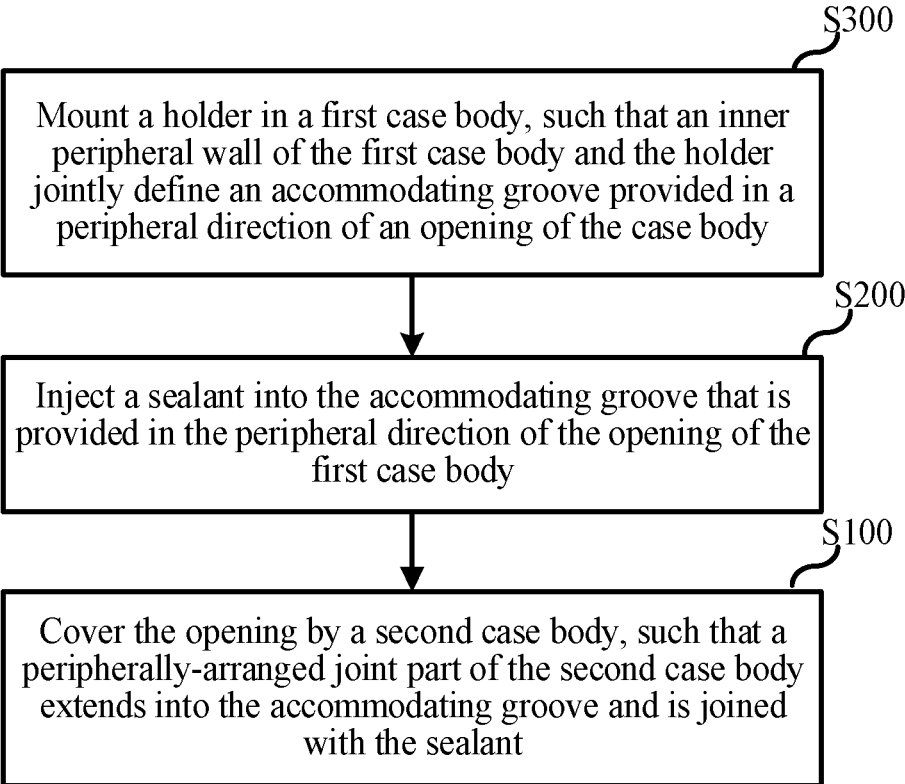

S300

Mount a holder in a first case body, such that an inner peripheral wall of the first case body and the holder jointly define an accommodating groove provided in a peripheral direction of an opening of the case body

S200

Inject a sealant into the accommodating groove that is provided in the peripheral direction of the opening of the first case body

S100

Cover the opening by a second case body, such that a peripherally-arranged joint part of the second case body extends into the accommodating groove and is joined with the sealant

FIG. 21

CASE, BATTERY, POWER CONSUMING DEVICE, AND METHOD FOR ASSEMBLING CASE

CROSS-REFERENCE TO RELATED APPLICATION

The present application is a continuation of International Application PCT/CN2021/091336, filed Apr. 30, 2021, which claims priority to Chinese Patent Application No. CN 202010901525.8, filed on Aug. 31, 2020, entitled "CASE, BATTERY, POWER CONSUMING DEVICE, AND METHOD FOR ASSEMBLING CASE", the contents of which are incorporated herein by reference in their entireties.

TECHNICAL FIELD

The present application relates to the technical field of traction batteries, and in particular, to a case, a battery, a power consuming device, and a method for assembling a case.

BACKGROUND ART

In order to ensure the sealing performance of a battery, it is generally necessary to seal between a first case body and a second case body of the battery. In some cases, a sealing ring is arranged between the first case body and the second case body to seal the first case body and the second case body. The sealing in this sealing mode is likely to fail.

SUMMARY OF THE INVENTION

Embodiments of the present application provide a case, a battery, a power consuming device, and a method for assembling a case, to solve the problem of sealing in an existing sealing mode being likely to fail.

According to a first aspect, an embodiment of the present application provides a case, comprising a first case body, an accommodating groove, a sealant, and a second case body, wherein the first case body is provided with an opening; the accommodating groove is provided in a peripheral direction of the opening; the sealant is accommodated in the accommodating groove; and the second case body is provided with a peripherally-arranged joint part, wherein the joint part is configured to extend into the accommodating groove and be joined with the sealant when the second case body covers the opening, so as to form a sealed connection between the first case body and the second case body.

In the case provided in the present application, since the sealant is accommodated in the accommodating groove, the accommodating groove limits the sealant, the sealant does not shift in the accommodating groove, and a sealing failure is less likely to occur, thus ensuring the sealing performance of the sealant. Since the joint part of the second case body extends into the accommodating groove and is joined with the sealant, the accommodating groove can also limit the joint part. During mounting, after the sealant is injected into the accommodating groove, the joint part of the second case body extends into the accommodating groove and is joined with the sealant, so that the first case body and the second case body are sealed, making the mounting convenient and quick. During the mounting, even if the second case body is pressed excessively, the sealant is always accommodated in the accommodating groove, and the joint part of the second case body and the sealant can always be kept in a joined state, so that the sealing failure will not be caused by the excessive pressing of the second case body.

In some embodiments of the present application, the joint part is configured to extend into the accommodating groove and be inserted into the sealant, such that the joint part is joined with the sealant.

In the foregoing solution, the joining of the joint part and the sealant is implemented by inserting the joint part into the sealant, so that the firmness of the joint part and the sealant after the joining is improved, a contact area between the sealant and the joint part is increased, and the sealing performance between the first case body and the second case body is improved.

In some embodiments of the present application, the accommodating groove is located on an inner side of the first case body.

In the foregoing solution, the accommodating groove is provided on the inner side of the first case body, so that a space inside the first case body is effectively utilized, an external space occupied by the first case body is reduced, and the energy density of the battery is increased.

In some embodiments of the present application, the case further comprises a holder arranged in the first case body, wherein an inner peripheral wall of the first case body and the holder jointly define the accommodating groove.

In the foregoing solution, the holder arranged inside the case and the inner peripheral wall of the first case body jointly define the accommodating groove, so that the structure is simple, and the accommodating groove can be as close to a peripheral edge of the first case body as possible. In addition, the holder arranged in the first case body can achieve a certain effect of reinforcing the first case body.

In some embodiments of the present application, the holder is provided with a limiting portion; and the limiting portion is configured to abut against a battery unit located in the first case body to limit a movement of the battery unit in a direction approaching the second case body.

In the foregoing solution, the limiting portion of the holder can limit the battery unit placed in the first case body, so as to reduce a possibility of shaking of the battery unit in the first case body. That is to say, the holder has two functions, one is to define the accommodating groove with the inner peripheral wall of the first case body, and the other is to limit the battery unit in the first case body.

In some embodiments of the present application, the holder is integrally formed with the first case body; or the holder is separate from the first case body.

In the foregoing solution, the holder and the first case body are integrally formed, so that the holder and the first case body form a whole, which improves the firmness between the holder and the first case body, no gap is formed between the holder and the first case body, and no sealant leakage occurs at the accommodating groove. Where the holder is separate from the first case body, the holder and the first case body can be manufactured separately and then assembled with each other, which can effectively reduce the forming difficulty of the accommodating groove and reduce production costs.

In some embodiments of the present application, the case further comprises a first locking member via which the holder is connected to the first case body.

In the foregoing solution, the holder is connected to the first case body via the first locking member, so that the firmness of the holder after being arranged on the inner side of the first case body is improved, and the possibility of shaking of the battery unit in the first case body is further reduced.

In some embodiments of the present application, the first case body is provided with a first mounting hole, and the holder is provided with a second mounting hole; and the first locking member sequentially passes through the first mounting hole, the sealant and the second mounting hole to connect the holder to the first case body.

In the foregoing solution, since the first locking member sequentially passes through the first mounting hole, the sealant and the second mounting hole, the first locking member fixes the sealant to prevent the sealant from dropping from the accommodating groove while the first locking member locks the holder to the first case body.

In some embodiments of the present application, the joint part is provided with a notch for avoiding the first locking member, and the sealant completely covers the notch. In the foregoing technical solution, since the joint part is provided with the notch, the first locking member enters the notch during the process of inserting the joint part into the sealant, so that interference between the joint part and the first locking member is prevented, and it is ensured that the joint part can be inserted to a deeper position in the sealant. Since the sealant completely covers the notch, external media (gas, liquid, etc.) are prevented from entering the case through the notch, thus ensuring a good sealing performance.

In some embodiments of the present application, an outer peripheral wall of the holder comprises a first peripheral surface and a second peripheral surface, wherein the first peripheral surface is attached to the inner peripheral wall of the first case body; and the second peripheral surface is arranged spaced apart from the inner peripheral wall of the first case body, wherein the second peripheral surface is one side wall of the accommodating groove, and the inner peripheral wall of the first case body is the other side wall of the accommodating groove.

In the foregoing solution, the first peripheral surface of the holder is attached to the inner peripheral wall of the first case body, so that the positioning of the holder and the first case body can be implemented, and the possibility of shaking of the holder in the first case body can be effectively reduced. In addition, the sealant located in the accommodating groove does not overflow from between the first peripheral surface and the inner peripheral wall of the first case body.

In some embodiments of the present application, the outer peripheral wall of the holder further comprises: a stepped surface formed between the first peripheral surface and the second peripheral surface, wherein the stepped surface is a bottom wall of the accommodating groove.

In the foregoing solution, the stepped surface of the holder is the bottom wall of the accommodating groove, that is, the bottom wall (the stepped surface) and one side wall (the second peripheral surface) of the accommodating groove are both located on the holder, so that the holder is reasonably utilized, and the structure of the first case body is simplified.

In some embodiments of the present application, the case further comprises a second locking member via which the second case body is connected to the first case body.

In the foregoing solution, the second case body is connected to the first case body via the second locking member, which improves the firmness of the joint part of the second case body and the sealant after the joining.

In some embodiments of the present application, the first case body is provided with a third mounting hole, and the second case body is provided with a fourth mounting hole; and the second locking member sequentially passes through the third mounting hole and the fourth mounting hole to connect the first case body to the second case body; wherein the third mounting hole is closer to the opening than the sealant.

In the foregoing solution, the third mounting hole in the first case body for the second locking member to pass through is closer to the opening of the first case body than the sealant, which can effectively prevent the leakage of the sealant from the third mounting hole in the process of injecting the sealant into the accommodating groove.

According to a second aspect, an embodiment of the present application provides a battery, comprising a battery unit and a case provided according to the first aspect, wherein the battery unit is accommodated in a sealed space defined by the first case body and the second case body.

In the foregoing solution, since the sealant of the case is accommodated in the accommodating groove, the sealant is less likely to fail, and a very good sealing performance is achieved between the first case body and the second case body, which can provide a long-term stable sealing environment for the battery unit.

According to a third aspect, an embodiment of the present application provides a power consuming device, comprising a battery provided according to the second aspect.

In the foregoing solution, the battery of the power consuming device has a very good sealing performance, and a case of the battery can provide a long-term stable sealing environment for the battery unit.

According to a fourth aspect, an embodiment of the present application provides a method for assembling a case, the method comprising: injecting a sealant into an accommodating groove provided in a peripheral direction of an opening of a first case body; and covering the opening by a second case body, such that a peripherally-arranged joint part of the second case body extends into the accommodating groove and is joined with the sealant.

By means of the foregoing method, the battery can be quickly assembled, and the assembled battery has a very good sealing performance. Since the sealant is injected into the accommodating groove, the accommodating groove limits the sealant, the sealant does not shift in the accommodating groove, and the sealing failure is less likely to occur, thus ensuring sealing performance of the sealant. After the joint part of the second case body is joined with the sealant, the second case body and the first case body can provide a long-term stable sealing environment for the battery unit.

In some embodiments of the present application, the method further comprises: mounting a holder in the first case body, such that an inner peripheral wall of the first case body and the holder jointly define the accommodating groove that is provided in the peripheral direction of the opening of the first case body.

In the foregoing solution, the holder is mounted in the first case body, and the holder and the inner peripheral wall of the first case body jointly define the accommodating groove, so that the accommodating groove can be as close to a peripheral edge of the first case body as possible, the forming difficulty of the accommodating groove is effectively reduced, and production costs are reduced.

BRIEF DESCRIPTION OF THE DRAWINGS

In order to more clearly describe the technical solutions of the embodiments of the present application, the accompanying drawings required in the embodiments of the present application will be described briefly below. It is apparent that the accompanying drawings described below are only for some embodiments of the present application. For those of ordinary skill in the art, other accompanying drawings can also be obtained from these accompanying drawings without any creative effort.

FIG. 21 is a flowchart of a method for assembling a case provided in some other embodiments of the present application.

Figure 1:
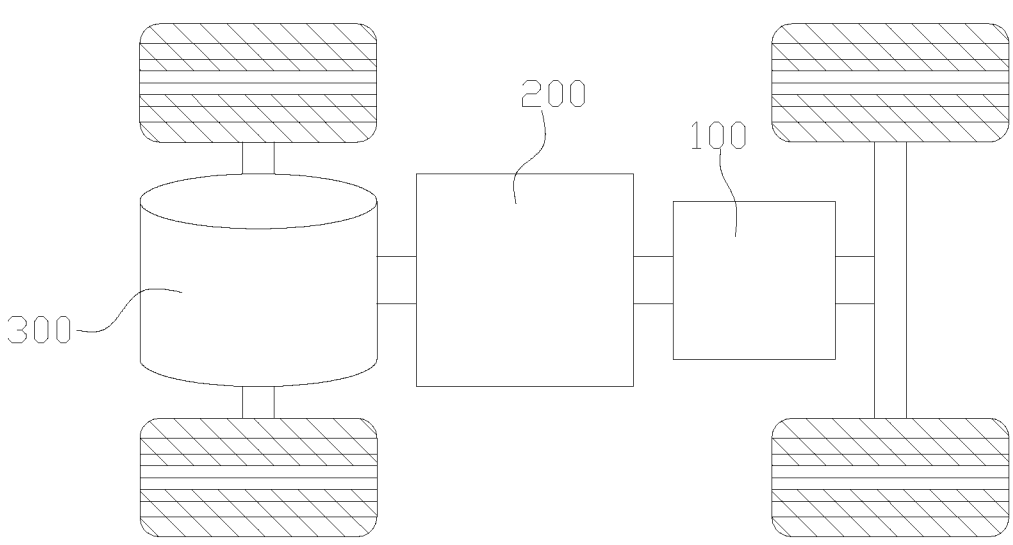
FIG. 1 is a schematic structural diagram of a vehicle provided in some embodiments of the present application.

The figures of the drawings are not drawn to scale.

List of reference signs: 10—Case; 11—First case body; 111—Opening; 112—First mounting hole; 113—Third mounting hole; 12—Accommodating groove; 13—Sealant; 14—Second case body; 141—Joint part; 1411—Recessed portion; 1411*a*—Annular groove; 1411*b*—Air discharge hole; 1412—Notch; 1413—Fourth mounting hole; 142—Main body; 143—Bent structure; 15—Holder; 151—First peripheral surface; 152—Second peripheral surface; 153—Stepped surface; 154—First enclosing body; 155—Second enclosing body; 156—Connecting body; 157—Limiting portion; 158—Second mounting hole; 159—Border; 16—First locking member; 17—First nut; 18—First sealing ring; 19—Second locking member; 20—Second nut; 21—Second sealing ring; 22—Sealed space; 30—Battery unit; 31—Insulator; 32—Buffer member; 33—Battery cell; 100—Battery; 200—Controller; 300—Motor; 1000—Vehicle.

DETAILED DESCRIPTION OF EMBODIMENTS

In order to make the objects, technical solutions and advantages of embodiments of the present application clearer, the technical solutions in the embodiments of the present application will be described clearly and completely below with reference to the accompanying drawings in the embodiments of the present application. Obviously, the embodiments described are some of, rather than all of, the embodiments of the present application. Generally, the assemblies of the embodiments of the present application described and illustrated in the accompanying drawings herein may be arranged and designed in a variety of different configurations.

Thus, the following detailed description of the embodiments of the present application provided in the accompanying drawings is not intended to limit the scope of the present application as claimed, but is merely representative of the selected embodiments of the present application. All the other embodiments obtained by those of ordinary skill in the art based on the embodiments of the present application without creative efforts shall fall within the scope of protection of the present application.

It should be noted that like numerals and letters refer to like items in the following accompanying drawings, so once an item is defined in one accompanying drawing, it does not require further definition and explanation in subsequent accompanying drawings.

In the description of the embodiments of the present application, it should be noted that the indicated orientation or position relationship is based on the orientation or position relationship shown in the accompanying drawings, or is an orientation or position relationship of customary arrangement of the product of the present application in use, or an orientation or position relationship customarily understood by those skilled in the art, or an orientation or position relationship of customary arrangement of the product of the present application in use, and is merely for ease of description of the present application and simplification of the description, rather than indicating or implying that apparatuses or elements referred to must have a specific orientation or be constructed and operated in a specific orientation, and therefore cannot be construed as limiting the present application. In addition, the terms "first", "second", "third", etc. are merely used for distinct description, and shall not be construed as indicating or implying relative importance.

The inventors have found that in an existing case, a sealing ring is directly arranged between an end face of a first case body and an end face of a second case body, and the sealing ring of the case is likely to shift during vibration, resulting in a sealing failure of the sealing ring between the first case body and the second case body.

Therefore, embodiments of the present application provide a power consuming device, a battery, a case, and a method for assembling a case, to solve the problem of sealing in an existing sealing mode being likely to fail.

An embodiment of the present application provides a power consuming device. The power consuming device may be a vehicle, a mobile phone, a portable device, a notebook computer, a ship, a spacecraft, an electric toy, an electric tool, etc. The vehicle may be a fuel vehicle, a gas vehicle or a new-energy vehicle. The new-energy vehicle may be a battery electric vehicle, a hybrid vehicle, an extended-range vehicle, etc. The spacecraft includes an airplane, a rocket, an aerospace plane, a spaceship, etc. The electric toy includes a stationary or mobile electric toy, such as a game machine, an electric toy car, an electric toy ship, and an electric toy airplane. The electric tool includes a metal cutting electric tool, a grinding electric tool, an assembling electric tool, and a railway electric tool, such as an electric drill, an electric grinder, an electric wrench, an electric screwdriver, an electric hammer, an electric impact drill, a concrete vibrator, and an electric planer. The power consuming devices mentioned above are not specially limited in the embodiments of the present application.

For ease of description, an example in which a power consuming device is a vehicle is used for description in the following embodiments.

Referring to FIG. 1, a battery 100 is provided inside the vehicle 1000, and the battery 100 may be provided at the bottom, the head or the tail of the vehicle 1000. The battery 100 may be configured to supply power to the vehicle 1000. For example, the battery 100 may be used as an operating power supply of the vehicle 1000.

The vehicle 1000 may further comprise a controller 200 and a motor 300. The controller 200 is configured to control the battery 100 to supply power to the motor 300, for example, to satisfy working power requirements during starting, navigation and traveling of the vehicle 1000.

In some embodiments of the present application, the battery 100 can not only serve as an operating power supply for the vehicle 1000, but also serve as a driving power supply for the vehicle 1000, in place of or partially in place of fuel or natural gas, to provide driving power for the vehicle 1000.

The battery 100 provided in the embodiments of the present application refers to a single physical module including one or more battery units to provide a higher voltage and a larger capacity. For example, the battery 100 mentioned in the present application may include a battery module, a battery pack, etc. The battery 100 generally comprises a case for enclosing one or more battery units. The case can prevent liquid or other foreign matters from affecting charging or discharging of a battery cell.

The battery unit comprises one or more battery cells. If the battery unit comprises a plurality of battery cells which may be connected in series and/or in parallel together via a bus member.

In the present application, a battery cell may include a lithium ion secondary battery, a lithium ion primary battery, a lithium-sulfur battery, a sodium-lithium ion battery, a sodium ion battery or a magnesium ion battery, etc., which will not be limited in the embodiments of the present application. The battery cell may be cylindrical, flat, cuboid or in another shape, which will also not be limited in the embodiments of the present application. The battery cells are generally classified into three types depending on the way of package: cylindrical battery cells, prismatic battery cells and pouch battery cells, which also will not be limited in the embodiments of the present application.

The battery cell comprises an electrode assembly and an electrolytic solution. The electrode assembly is composed of a positive electrode plate, a negative electrode plate and a separator. The operation of the battery cell mainly relies on the movement of metal ions between the positive electrode plate and the negative electrode plate. The positive electrode plate comprises a positive electrode current collector and a positive electrode active material layer. The positive electrode active material layer is coated on a surface of the positive electrode current collector, and the current collector not coated with the positive electrode active material layer protrudes from the current collector coated with the positive electrode active material layer and is used as a positive electrode tab. Taking a lithium-ion battery as an example, the material of the positive electrode current collector may be aluminum, and the positive electrode active material may be lithium cobalt oxides, lithium iron phosphate, ternary lithium or lithium manganate, etc. The negative electrode plate comprises a negative electrode current collector and a negative electrode active material layer. The negative electrode active material layer is coated on a surface of the negative electrode current collector, and the current collector not coated with the negative electrode active material layer protrudes from the current collector coated with the negative electrode active material layer and is used as a negative electrode tab. The negative electrode current collector may be made of copper, and the negative electrode active material may be carbon, silicon, or the like. In order to ensure that no fusing occurs when a large current passes, a plurality of positive electrode tabs are provided and are stacked together, and a plurality of negative electrode tabs are provided and are stacked together. The separator may be made of PP or PE, etc. In addition, the electrode assembly may be of a wound structure or a laminated structure, which will not be limited in the embodiments of the present application.

Figure 2:
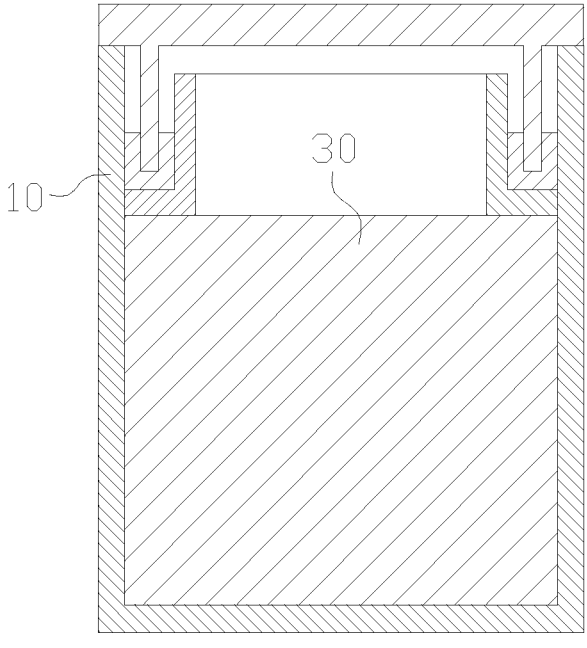
FIG. 2 is a schematic structural diagram of a battery provided in some embodiments of the present application.

Referring to FIG. 2, a battery 100 provided in an embodiment of the present application comprises a case 10 and a battery unit 30. The battery unit 30 is accommodated in the case 10, and the case 10 can provide a long-term stable sealing environment for the battery unit 30.

Referring to FIGS. 3-8, a case 10 provided in an embodiment of the present application comprises a first case body 11, an accommodating groove 12, a sealant 13, and a second case body 14.

The first case body 11 is provided with an opening 111, the accommodating groove 12 is provided in a peripheral direction of the opening 111, and the sealant 13 is accommodated in the accommodating groove 12. The second case body 14 is provided with a peripherally-arranged joint part 141. The joint part 141 is configured to extend into the accommodating groove 12 and be joined with the sealant 13 when the second case body 14 covers the opening 111, so as to form a sealed connection between the first case body 11 and the second case body 14.

Since the sealant 13 is accommodated in the accommodating groove 12, the accommodating groove 12 limits the sealant 13, the sealant 13 does not shift in the accommodating groove 12, and a sealing failure is less likely to occur, thus ensuring sealing performance of the sealant 13. Since the joint part 141 of the second case body 14 extends into the accommodating groove 12 and is joined with the sealant 13, the accommodating groove 12 can also limit the joint part 141. During mounting, after the sealant 13 is injected into the accommodating groove 12, the joint part 141 of the second case body 14 extends into the accommodating groove 12 and is joined with the sealant 13, so that the first case body 11 and the second case body 14 are sealed, making the mounting convenient and quick. During the mounting, even if the second case body 14 is pressed excessively, the sealant 13 is always accommodated in the accommodating groove 12, and the joint part 141 of the second case body 14 and the sealant 13 can always be kept in a joined state, so that the sealing failure will not be caused by the excessive pressing of the second case body 14.

The first case body 11 may be a case cover for the second case body 14, or the second case body 14 may be a case cover for the first case body 11. The following embodiments are all explained by taking an example in which the second case body 14 is the case cover for the first case body 11. It can be understood that the second case body 14 is located on an upper side of the first case body 11.

The first case body 11 has a hollow structure with the top provided with an opening 111. The first case body 11 may be a cuboid, a cylinder, etc.

The second case body 14 is further provided with a main body 142 for covering the opening 111 of the first case body 11, and the joint part 141 is fixed to the bottom of the main body 142. The joint part 141 may be a rectangular ring, a circular ring, or the like.

When the first case body 11 is a cuboid, the main body 142 of the second case body 14 may have a rectangular structure, and the joint part 141 of the second case body 14 may be a rectangular ring. When the first case body 11 is a cylinder, the main body 142 of the second case body 14 may have a circular structure, and the joint part 141 of the second case body 14 may be a circular ring.

It should be noted that the joint part 141 of the second case body 14 is joined with the sealant 13. It can be understood that the sealant 13 and the joint part 141 are connected together after the sealant 13 in the accommodating groove 12 is solidified. The joint part 141 is joined with the sealant 13 in various manners.

Figure 3:
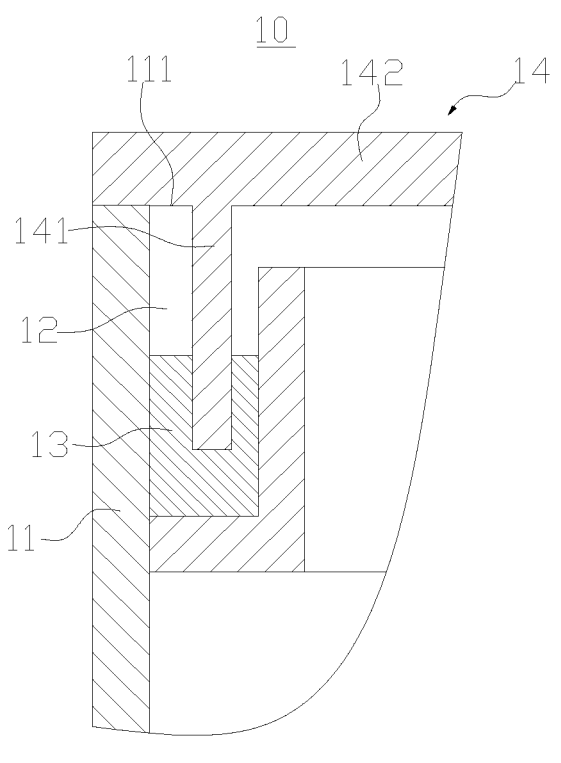
FIG. 3 is a partial view of a case (a first possible implementation in which a joint part and a sealant are joined in a first manner) provided in some embodiments of the present application.
Figure 4:
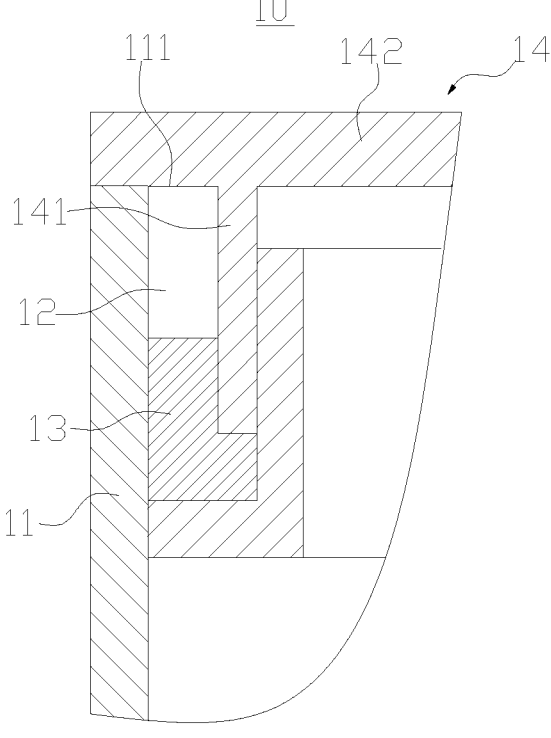
FIG. 4 is a partial view of a case (a second possible implementation in which a joint part and a sealant are joined in a first manner) provided in some embodiments of the present application.
Figure 5:
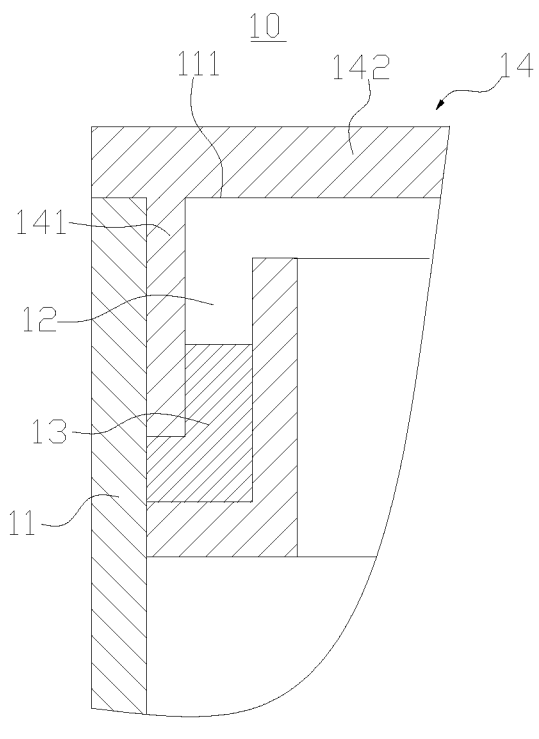
FIG. 5 is a partial view of a case (a third possible implementation in which a joint part and a sealant are joined in a first manner) provided in some embodiments of the present application.

Referring to FIGS. 3-5, in some embodiments of the present application, the joint part 141 is inserted into the sealant 13, so that the joint part 141 is joined with the sealant 13. Such a structure improves the firmness of the joint part 141 and the sealant 13 after the joining, increases a contact area between the sealant 13 and the joint part 141, and improves the sealing performance between the first case body 11 and the second case body 14.

When the joint part 141 is inserted into the sealant 13, the joint part 141 has three arrangements. Referring to FIG. 3, the first arrangement is that an inner peripheral wall and an outer peripheral wall of the joint part 141 are each at a distance from a side wall of the accommodating groove 12. Referring to FIG. 4, the second arrangement is that the inner peripheral wall of the joint part 141 is attached to one side wall of the accommodating groove 12. Referring to FIG. 5, the third arrangement is that the outer peripheral wall of the joint part 141 is attached to one side wall of the accommodating groove 12.

When the joint part 141 is inserted into the sealant 13, the joint part 141 may extend to a bottom wall of the accommodating groove 12, or the joint part 141 may be at a certain distance from the bottom wall of the accommodating groove 12.

Figure 6:
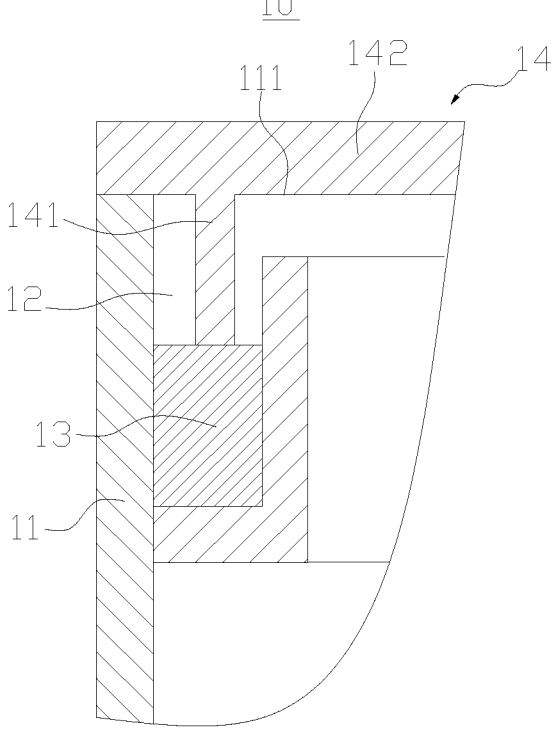
FIG. 6 is a partial view of a case (in which a joint part and a sealant are joined in a second manner) provided in some embodiments of the present application.

Referring to FIG. 6, in some embodiments of the present application, an end face of the end of the joint part 141 extending into the accommodating groove 12 is exactly adhered to an upper surface of the sealant 13, so that the joint part 141 is joined with the sealant 13.

Figure 7:
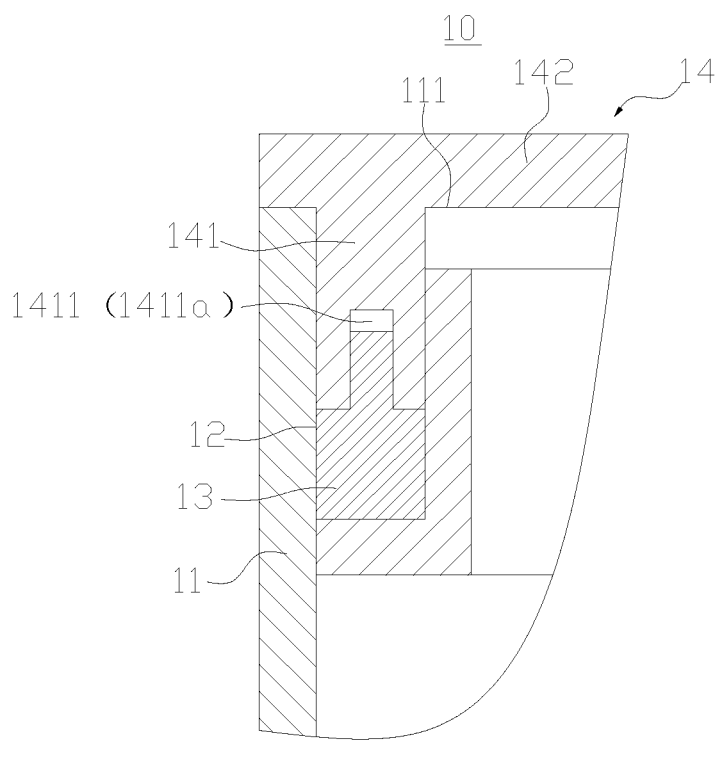
FIG. 7 is a partial view of a case (a first possible implementation in which a joint part and a sealant are joined in a third manner) provided in some embodiments of the present application.
Figure 8:
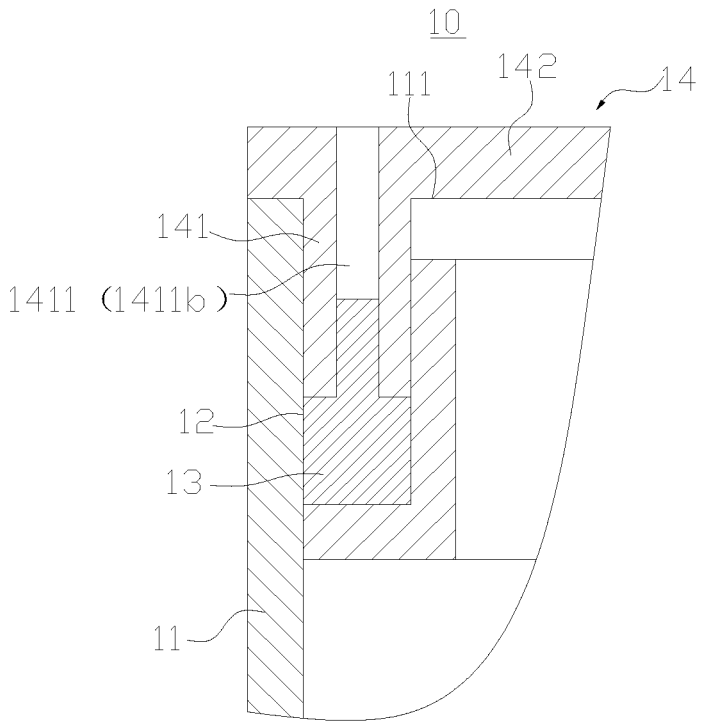
FIG. 8 is a partial view of a case (a second possible implementation in which a joint part and a sealant are joined in a third manner) provided in some embodiments of the present application.

Referring to FIGS. 7 and 8, in some embodiments of the present application, the end face of the end of the joint part 141 extending into the accommodating groove 12 is provided with a recessed portion 1411, and the sealant 13 extends into the recessed portion 1411, so that the joint part 141 is joined with the sealant 13.

The joint part 141 may have a thickness equal to a width of the accommodating groove 12. That is, the inner peripheral wall and the outer peripheral wall of the joint part 141 are respectively attached to two side walls of the accommodating groove 12. In the process of inserting the joint part 141 into the accommodating groove 12, the joint part 141 squeezes the sealant 13 from the accommodating groove 12 into the recessed portion 1411.

The recessed portion 1411 may be of various structures. Referring to FIG. 7, the recessed portion 1411 may be an annular groove 1411a provided in the joint part 141. Referring to FIG. 8, the recessed portion 1411 may be an air discharge hole 1411b provided in the joint part 141. The air discharge hole 1411b may be a circular hole, a square hole, or the like.

Figure 9:
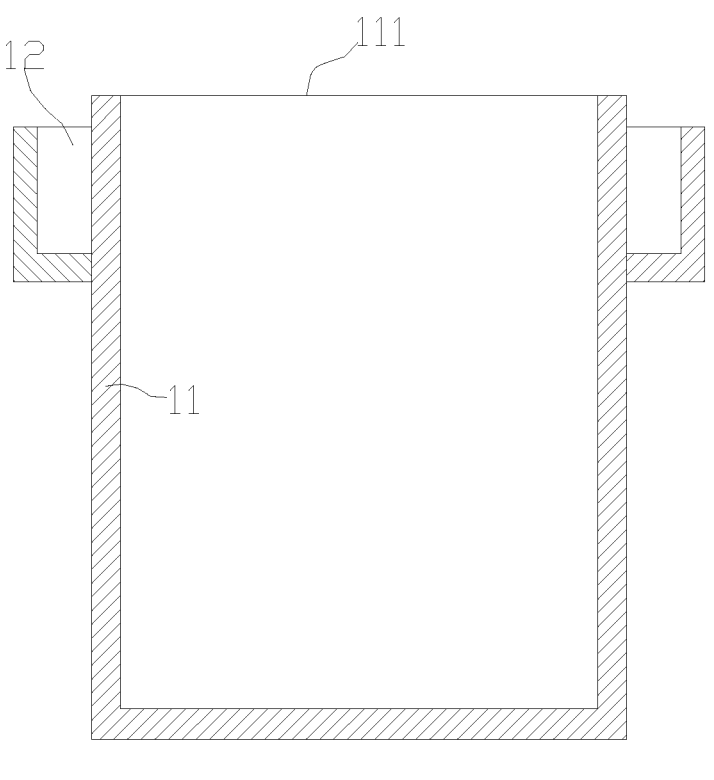
FIG. 9 is a diagram showing a first possible positional relationship between a first case body and an accommodating groove provided in some embodiments of the present application.
Figure 10:
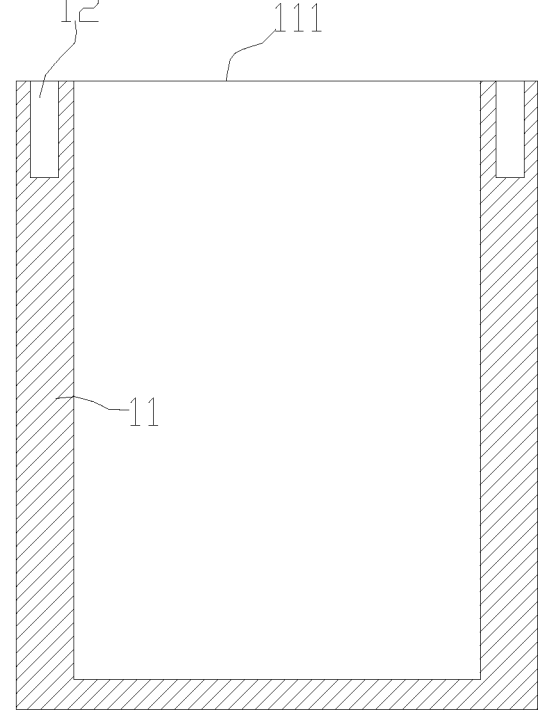
FIG. 10 is a diagram showing a second possible positional relationship between a first case body and an accommodating groove provided in some embodiments of the present application.
Figure 11:
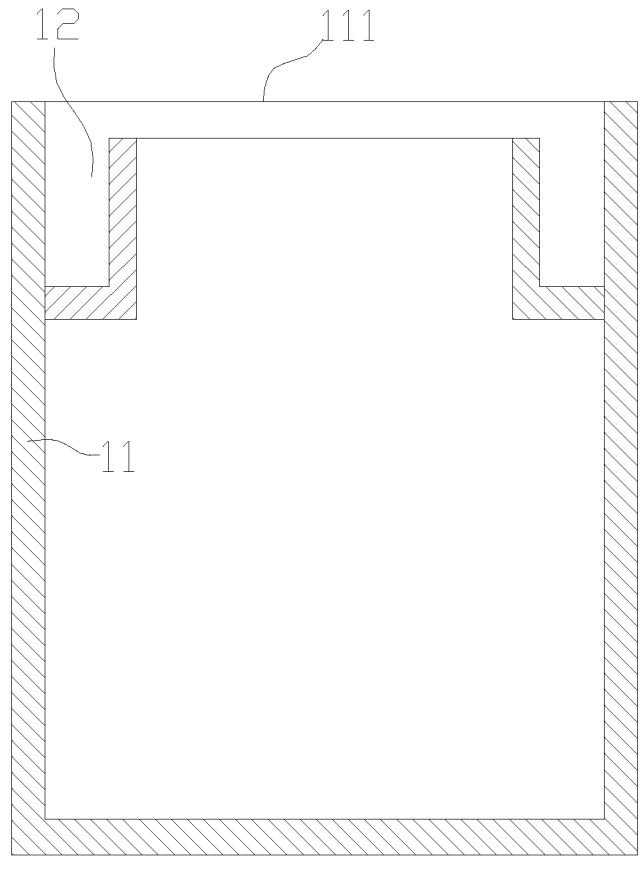
FIG. 11 is a diagram showing a third possible positional relationship between a first case body and an accommodating groove provided in some embodiments of the present application.

In the embodiment of the present application, the accommodating groove 12 is provided in the first case body 11, and the accommodating groove 12 may be provided in various forms. Referring to FIG. 9, the accommodating groove 12 may be provided on an outer side of the first case body 11. Referring to FIG. 10, the accommodating groove 12 may also be provided in an end face of the first case body 11. Referring to FIG. 11, the accommodating groove 12 may also be provided on an inner side of the first case body 11, to effectively utilize a space inside the first case body 11, reduce an external space occupied by the first case body 11, and increase the energy density of the battery 100.

Figure 12:
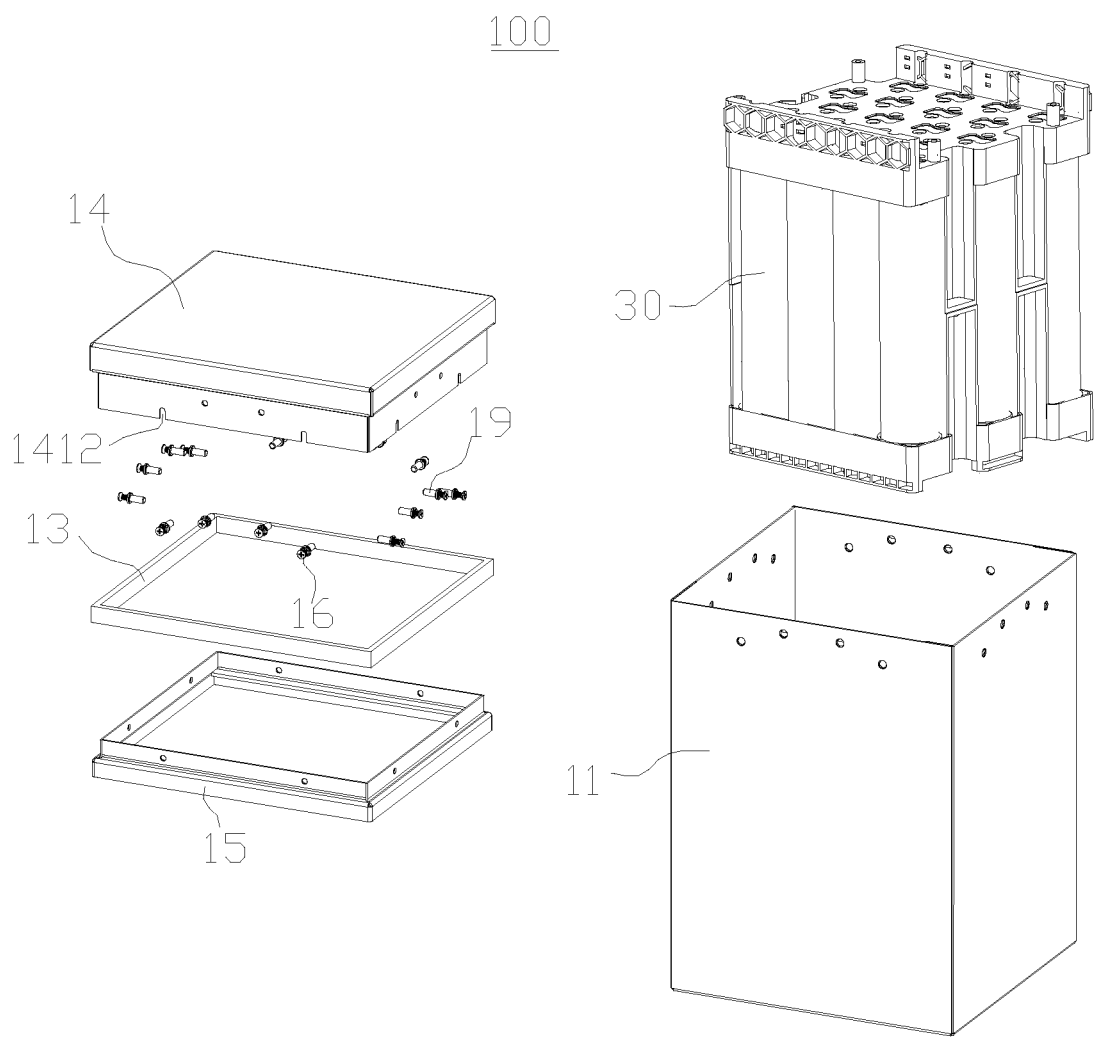
FIG. 12 is an exploded view of a battery provided in some embodiments of the present application.
Figure 13:
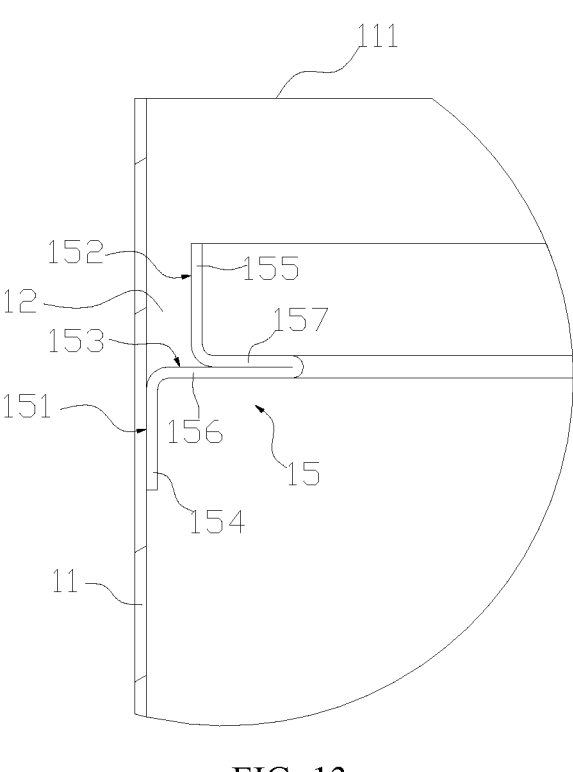
FIG. 13 is a diagram showing a positional relationship between a first case body and a holder provided in some embodiments of the present application.

Referring to FIGS. 12 and 13, in some embodiments of the present application, the case 10 further comprises a holder 15. The holder 15 is arranged in the first case body 11, and the holder 15 and an inner peripheral wall of the first case body 11 jointly define an accommodating groove 12 (shown in FIG. 13) located on the inner side of the first case body 11.

The holder 15 arranged inside the case 10 and the inner peripheral wall of the first case body 11 jointly define the accommodating groove 12, so that the structure is simple, and the accommodating groove 12 can be as close to a peripheral edge of the first case body 11 as possible. In addition, the holder 15 arranged in the first case body 11 can achieve a certain effect of reinforcing the first case body 11.

With continued reference to FIG. 13, in this embodiment, the holder 15 is separate from the first case body 11. The holder 15 and the first case body 11 can be manufactured separately and then assembled with each other, which can effectively reduce the forming difficulty of the accommodating groove 12 and reduce production costs.

In some embodiments of the present application, the outer peripheral wall of the holder 15 comprises a first peripheral surface 151 and a second peripheral surface 152. The first peripheral surface 151 is attached to the inner peripheral wall of the first case body 11. The second peripheral surface 152 is arranged spaced apart from the inner peripheral wall of the first case body 11. The second peripheral surface 152 is one side wall of the accommodating groove 12, and the inner peripheral wall of the first case body 11 is the other side wall of the accommodating groove 12.

In the foregoing structure, the first peripheral surface 151 of the holder 15 is attached to the inner peripheral wall of the first case body 11, so that the positioning of the holder 15 and the first case body 11 can be implemented, and the possibility of shaking of the holder 15 in the first case body 11 can be effectively reduced; and the sealant 13 located in the accommodating groove 12 does not overflow from between the first peripheral surface 151 and the inner peripheral wall of the first case body 11.

In some embodiments of the present application, the outer peripheral wall of the holder 15 further comprises a stepped surface 153. The stepped surface 153 is formed between the first peripheral surface 151 and the second peripheral surface 152, and the stepped surface 153 is a bottom wall of the accommodating groove 12.

The stepped surface 153 of the holder 15 is the bottom wall of the accommodating groove 12, that is, the bottom wall (the stepped surface 153) and one side wall (the second peripheral surface 152) of the accommodating groove 12 are both located on the holder 15, so that the holder 15 is reasonably utilized, and the structure of the first case body 11 is simplified.

In other embodiments, the bottom wall of the accommodating groove 12 may also be provided on the first case body 11.

Illustratively, the holder 15 is of a hollow frame structure, which can effectively reduce the weight of the holder 15, and facilitates placement of components such as a circuit board (not shown in the figures) and a wiring harness (not shown in the figures).

In some embodiments, the holder 15 includes a first enclosing body 154, a second enclosing body 155, and a connecting body 156. The first enclosing body 154 is connected to the second enclosing body 155 via the connecting body 156. The second enclosing body 155 is closer to the opening 111 of the case 10 than the first enclosing body 154. The first peripheral surface 151 is an outer surface of the first enclosing body 154, the second peripheral surface 152 is an outer surface of the second enclosing body 155, and the stepped surface 153 is an outer surface of the connecting body 156.

Figure 14:
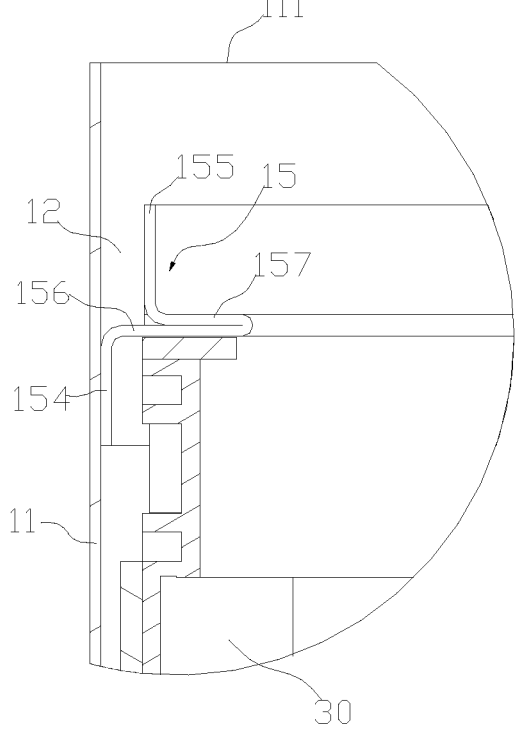
FIG. 14 is a diagram showing a positional relationship between a first case body, a holder and a battery unit provided in some embodiments of the present application.

In some embodiments, referring to FIG. 14, the holder 15 further includes a limiting portion 157. The limiting portion 157 is configured to abut against a battery unit 30 located in the first case body 11 to limit a movement of the battery unit 30 in a direction approaching the second case body 14.

The limiting portion 157 of the holder 15 can limit the battery unit 30 placed in the first case body 11, so as to reduce a possibility of shaking of the battery unit 30 in the first case body 11. That is to say, the holder 15 has two functions, one is to define the accommodating groove 12 with the inner peripheral wall of the first case body 11, and the other is to limit the battery unit 30 in the first case body 11.

During actual assembly, the battery unit 30 may be first placed in the first case body 11, and then the holder 15 is mounted in the first case body 11, so that the limiting portion 157 is pressed aganist the top of the battery unit 30, thereby limiting the battery unit 30 in the first case body 11.

Illustratively, the limiting portion 157 extends from the connecting body 156 in a direction approaching a centre of the first case body 11.

The limiting portion 157 may be arranged along the entire periphery of the connecting body 156. That is, the limiting portion 157 has an annular structure, such as a rectangular ring or a circular ring. The limiting portion 157 may also be partially arranged in the peripheral direction of the connecting body 156. For example, the connecting body 156 is of a rectangular ring structure, and the limiting portion 157 is arranged on one, two or three sides of the connecting body 156.

Figure 15:
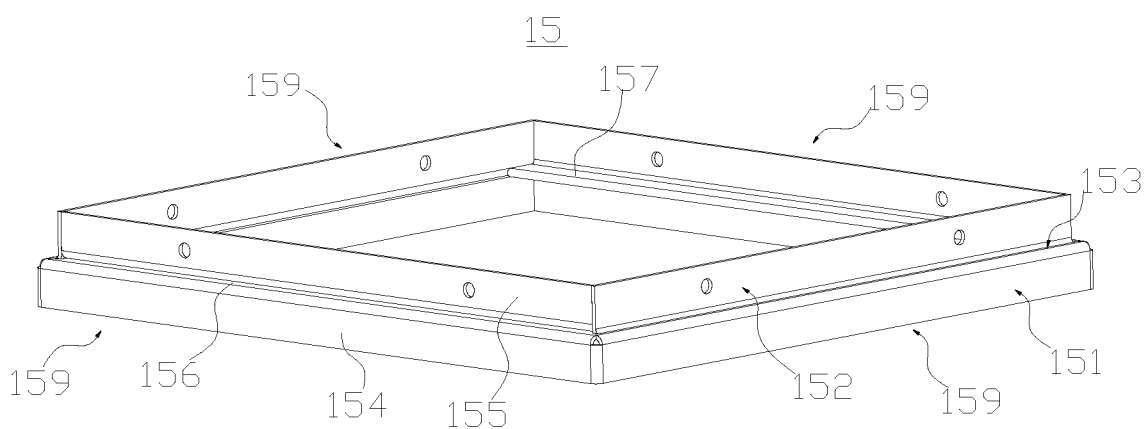
FIG. 15 is a schematic structural diagram of a holder provided in some embodiments of the present application.

In some embodiments, as shown in FIG. 15, the holder 15 is of a rectangular ring structure, and the holder 15 comprises four borders 159 sequentially connected end to end. It can be understood that the first enclosing body 154, the second enclosing body 155 and the connecting body 156 of the holder 15 are each of a rectangular ring structure. Two opposite sides of the connecting body 156 are each provided with a limiting portion 157.

As for the holder 15, the holder 15 may be of an integrated structure or a split structure. When the holder 15 is of a split structure, four borders 159 of the holder 15 may be manufactured separately, and then the four borders 159 are connected together by means of welding. The four borders 159 may all be formed from plates by means of bending.

If the holder 15 is not fixed to the first case body 11, after the sealant 13 is injected into the accommodating groove 12, the sealant 13 can achieve a certain effect of fixing the holder 15 to the first case body 11. That is, the holder 15 is adhered to the first case body 11 by means of the sealant 13.

Figure 16:
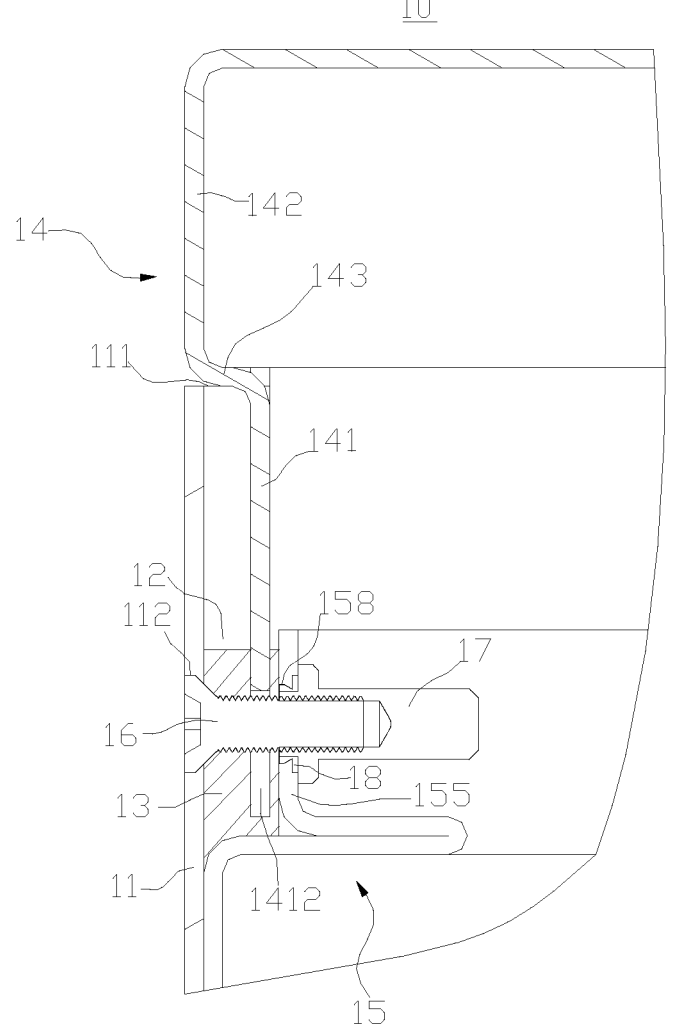
FIG. 16 is a schematic diagram of a first possible structure of a case (in which a first case body is connected to a holder via a first locking member) provided in some embodiments of the present application.

In some embodiments, referring to FIG. 16, to further improve the firmness of the holder 15, the case 10 may further comprise a first locking member 16. The holder 15 is connected to the first case body 11 via the first locking member 16, so as to connect and fix the holder 15 to the first case body 11, further reducing the possibility of shaking of the battery unit 30 in the first case body 11.

In some embodiments, the first case body 11 is provided with a first mounting hole 112, and the holder 15 is provided with a second mounting hole 158. The first locking member 16 sequentially passes through the first mounting hole 112, the sealant 13 and the second mounting hole 158 to connect the holder 15 to the first case body 11.

Since the first locking member 16 sequentially passes through the first mounting hole 112, the sealant 13 and the second mounting hole 158, the first locking member 16 fixes the sealant 13 to prevent the sealant 13 from dropping from the accommodating groove 12 while the first locking member 16 locks the holder 15 to the first case body 11.

In some embodiments, the sealant 13 completely covers the first mounting hole 112 and the second mounting hole 158. Even if a gap is provided between a peripheral wall of the first locking member 16 and a hole wall of the first mounting hole 112 or the second mounting hole 158, the sealant 13 can also block or occlude the gap, thus improving the sealing reliability of the case 10.

The second mounting hole 158 is provided in the second enclosing body 155 of the holder 15.

It should be noted that the first locking member 16 sequentially passing through the first mounting hole 112, the sealant 13 and the second mounting hole 158 only means a final state in which the first locking member 16 passes through the first mounting hole 112, the sealant 13 and the second mounting hole 158, and does not only mean that during assembly, the first locking member 16 first passes through the first mounting hole 112, then passes through the sealant 13, and finally passes through the second mounting hole 158.

During actual assembly, it is possible to first inject the sealant 13 into the accommodating groove 12, and then make the first locking member 16 pass through the first mounting hole 112 and the second mounting hole 158, so that the first locking member 16 naturally passes through the sealant 13, thereby finally connecting and fixing the holder 15 to the case 10. Certainly, it is also possible to first make the first locking member 16 pass through the first mounting hole 112 and the second mounting hole 158 to connect and fix the holder 15 to the case 10, and then inject the sealant 13 into the accommodating groove 12.

Illustratively, the first locking member 16 is a screw, and a first nut 17 is screwed to an end portion of the first locking member 16. The first nut 17 is located inside the first case body 11, and the first nut 17 is pressed against the second enclosing body 155 of the holder 15.

In a non-limiting example, the first nut 17 is a tubular member with one end open, and the first nut 17 is screwed to an outer side of the first locking member 16. The open end of the first nut 17 extends into the second mounting hole 158, and the part of the first nut 17 extending into the second mounting hole 158 forms a sealed connection with the hole wall of the second mounting hole 158. The part of the first nut 17 extending into the second mounting hole 158 may form a sealed connection with the hole wall of the second mounting hole 158 by means of a first sealing ring 18.

With continued reference to FIG. 16, where the first locking member 16 passes through the sealant 13, when the joint part 141 of the second case body 14 is inserted into the sealant 13, an end portion of the joint part 141 may extend to a region between the first locking member 16 and the bottom wall of the accommodating groove 12. In this case, the joint part 141 may be provided with a notch 1412 (shown in FIG. 12) for avoiding the first locking member 16, so as to prevent the joint part 141 from interfering with the first locking member 16 and ensure that the joint part 141 can be inserted to a deeper position in the sealant 13. In addition, the sealant completely covers the notch 1412, external media (gas, liquid, etc.) are prevented from entering the case 10 through the notch 1412, thus ensuring a good sealing performance.

Illustratively, in FIG. 16, the main body 142 of the second case body 14 and the joint part 141 are of an integrated structure, and the second case body 14 forms a bent structure 143 at the connection between the main body 142 and the joint part 141. When the joint part 141 is inserted into the sealant 13, the main body 142 naturally covers the opening 111 of the first case body 11.

Figure 17:
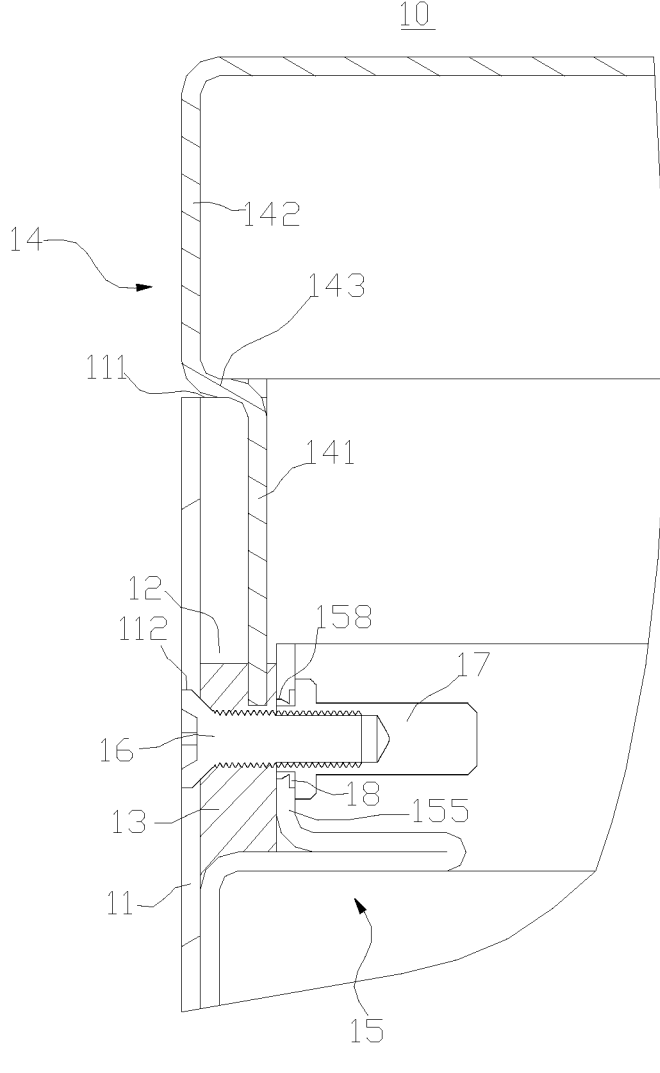
FIG. 17 is a schematic diagram of a second possible structure of a case (in which a first case body is connected to a holder via a first locking member) provided in some embodiments of the present application.

Referring to FIG. 17, where the first locking member 16 passes through the sealant 13, when the joint part 141 of the second case body 14 is inserted into the sealant 13, the end portion of the joint part 141 may also extend to a region between the first locking member 16 and an opening of the accommodating groove 12.

It should be noted that in addition to connecting and fixing the holder 15 to the case 10 via the first locking member 16, the holder 15 may also be connected and fixed to the case 10 by other means. For example, after the holder 15 is placed in the case 10, the holder is fixed to the case by means of welding.

Certainly, except that the holder 15 is separate from the first case body 11, the holder 15 may also be integrally formed with the first case body 11, so that the holder 15 and the first case body 11 form a whole, which improves the firmness between the holder 15 and the first case body 11, no gap is formed between the holder 15 and the first case body 11, and no sealant leakage occurs at the accommodating groove 12.

Where the holder 15 is integrally formed with the first case body 11, it is possible for the holder 15 to be provided with no limiting portion 157 (shown in FIG. 14). When the battery unit 30 (shown in FIG. 14) is mounted into the first case body 11, the battery unit 30 may be placed into the first case body 11 from the cente of the holder 15.

Figure 18:
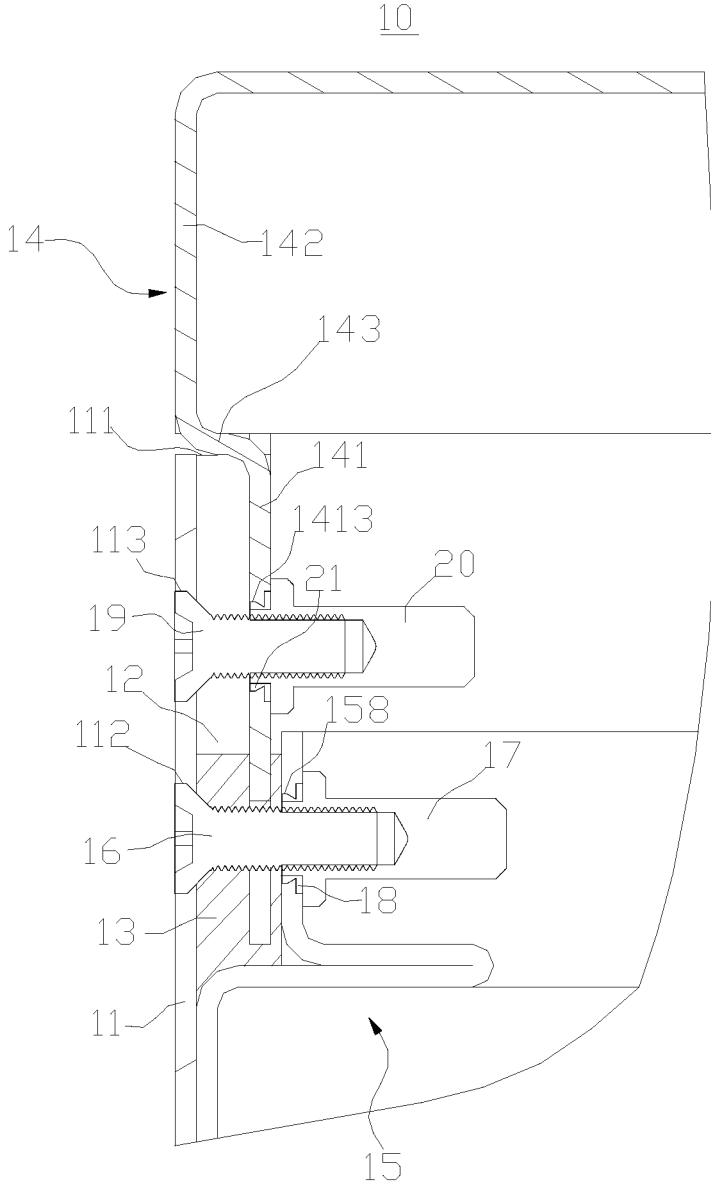
FIG. 18 is a schematic structural diagram of a case (in which a second case body is connected to a first case body via a second locking member) provided in some embodiments of the present application.

Referring to FIG. 18, in some embodiments, the case 10 may further comprise a second locking member 19. The second case body 14 is connected to the first case body 11 via the second locking member 19, so as to connect and fix the second case body 14 to the first case body 11. Such a structure improves the firmness between the joint part 141 of the second case body 14 and the sealant 13 after the joining. In addition, this structure also improves the stability of the connection between the second case body 14 and the first case body 11.

The first case body 11 is provided with a third mounting hole 113, and the second case body 14 is provided with a fourth mounting hole 1413. The second locking member 19 sequentially passes through the third mounting hole 113 and the fourth mounting hole 1413 to connect and fix the first case body 11 to the second case body 14.

Optionally, the third mounting hole 113 is closer to the opening 111 than the sealant 13. It can be understood that the third mounting hole 113 is higher than the sealant 13. Such a structure can effectively prevent the leakage of the sealant from the third mounting hole 113 during the injection of the sealant 13 into the accommodating groove 12, and avoid interference with the holder 15 during the passing of the second locking member 19.

Illustratively, the fourth mounting hole 1413 is provided in the joint part 141 of the second case body 14.

Illustratively, the second locking member 19 is a screw, and a second nut 20 is screwed to an end portion of the second locking member 19. The second nut 20 is located inside the first case body 11, and the second nut 20 is pressed against the joint part 141.

In a non-limiting example, the second nut 20 is a tubular member with one end open, and the second nut 20 is screwed to an outer side of the second locking member 19. The open end of the second nut 20 extends into the fourth mounting hole 1413, and the part of the second nut 20 extending into the fourth mounting hole 1413 forms a sealed connection with the hole wall of the fourth mounting hole 1413. The part of the second nut 20 extending into the fourth mounting hole 1413 may form a sealed connection with the hole wall of the second mounting hole 158 by means of a second sealing ring 21.

Figure 19:
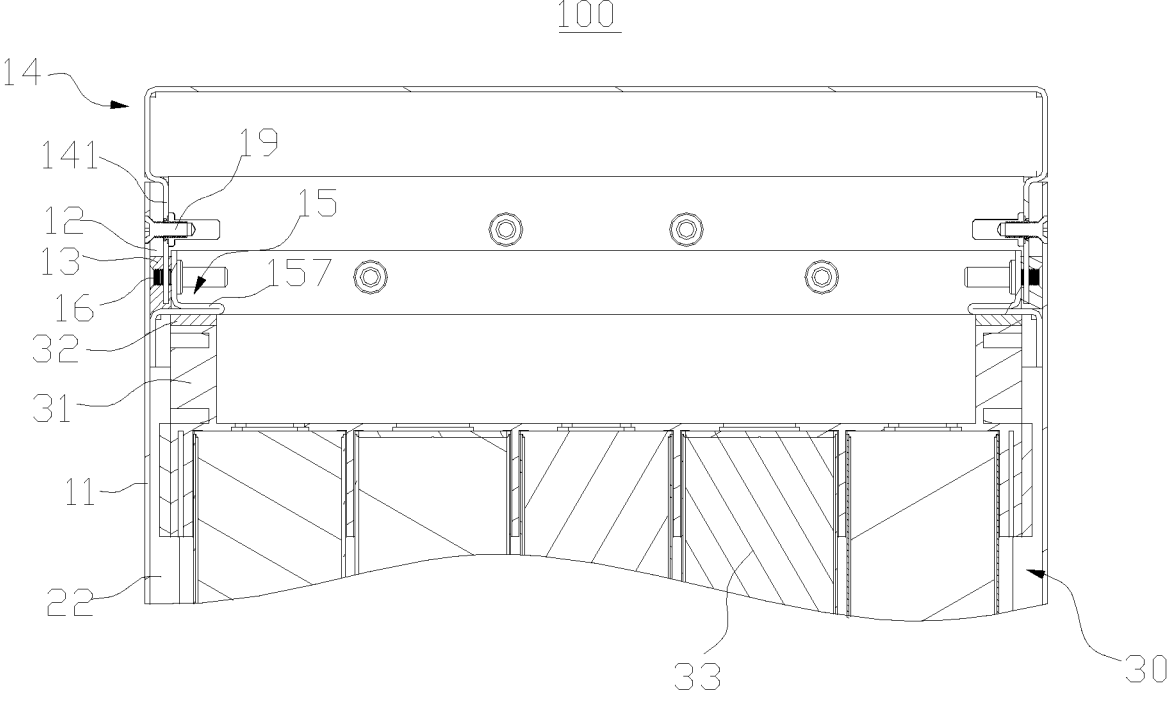
FIG. 19 is a partial view of a battery provided in some embodiments of the present application.

Referring to FIG. 19, in an embodiment of the present application, a battery unit 30 is accommodated in a sealed space 22 defined by the first case body 11 and the second case body 14.

In some embodiments, the top of the battery unit 30 abuts against the limiting portion 157 of the holder 15. The battery unit 30 may directly abut against the limiting portion 157, or the battery unit 30 may indirectly abut against the limiting portion 157.

In FIG. 19, the battery unit 30 indirectly abuts against the limiting portion 157, and the top of the battery unit 30 is provided with an insulator 31. The insulator 31 is configured to limit the battery unit 30, and achieve an insulating effect.

Referring to FIG. 19, in some embodiments, the top of the insulator 31 is provided with a buffer member 32. The buffer member 32 abuts against the limiting portion 157. The buffer member 32 is configured to buffer the insulator 31, prevent rigid contact between the insulator 31 and the limiting portion 157, and achieve a good damping effect on the battery unit 30. The buffer member 32 may be made of foam, rubber, etc.

The battery unit 30 comprises one or more battery cells 33. If the battery unit 30 comprises a plurality of battery cells 33, the plurality of battery cells 33 may be connected in series and/or in parallel together via a bus member (not shown in the figures). FIG. 19 shows a battery unit 30 comprising a plurality of cylindrical battery cells.

It should be noted that the case 10 provided in the embodiment of the present application is not only limited to being used to accommodate the battery unit 30, but the case 10 may also be used to accommodate other articles, such as goods that need to be protected from dust and water during transportation.

Figure 20:
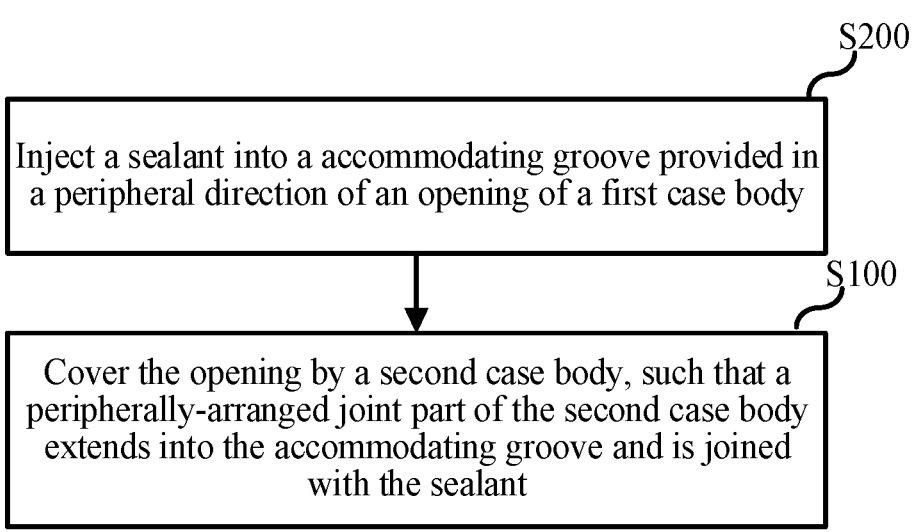
FIG. 20 is a flowchart of a method for assembling a case provided in some embodiments of the present application.

Referring to FIG. 20, an embodiment of the present application further provides a method for assembling a case 10, the method comprising the following steps.

In step S100, a sealant 13 is injected into an accommodating groove 12 provided in a peripheral direction of an opening 111 of a first case body 11.

In step S200, the opening 111 is covered by a second case body 14, such that a peripherally-arranged joint part 141 of the second case body 14 extends into the accommodating groove 12 and is joined with the sealant 13.

By means of the foregoing method, the case 10 can be quickly assembled, and the assembled case 10 has a very good sealing performance. Since the sealant 13 is injected into the accommodating groove 12, the accommodating groove 12 limits the sealant 13, the sealant 13 does not shift in the accommodating groove 12, and the sealing failure is less likely to occur, thus ensuring sealing performance of the sealant 13. After the joint part 141 of the second case body 14 is joined with the sealant 13, the second case body 14 and the first case body 11 can provide a long-term stable sealing environment.

As shown in FIG. 21, in some embodiments, the method for assembling a case 10 further comprises the following step.

In step S300, a holder 15 is mounted in the first case body 11, such that an inner peripheral wall of the first case body 11 and the holder 15 jointly define the accommodating groove 12 that is provided in the peripheral direction of the opening 111 of the first case body 11.

After the holder 15 is placed in the first case body 11, the holder 15 can be locked to the first case body 11 by means of the first locking member 16, and finally the inner peripheral wall of the first case body 11 and the holder 15 jointly define the accommodating groove 12 that is provided in peripheral direction of the opening 111 of the first case body 11.

After step S200 is performed, the second case body 14 may be locked to the first case body 11 by means of the second locking member 19.

It should be noted that when the battery 100 is assembled based on the foregoing method for assembling a case 10, the battery unit 30 may be first placed into the first case body, and then step S300 is performed. In the process of performing step S300, the limiting portion 157 of the holder 15 may first abut against the top of the battery unit 30, and then the holder 15 is locked to the first case body 11 by means of the first locking member 16. Certainly, it is also possible to first perform step S300, and then place the battery unit 30 into the first case body 11. For example, the holder 15 is first mounted in the first case body 11, and then the battery unit 30 is placed into the first case body 11 from the centre of the holder 15.

It should be noted that the foregoing embodiments and the features thereof in the present application may be combined with each other when no conflict occurs.

The foregoing descriptions are merely preferred embodiments of the present application, and are not intended to limit the present application. For those skilled in the art, various modifications and variations may be made to the present application. Any modifications, equivalent substitutions, improvements, and the like made within the spirit and principle of the present application should fall within the scope of protection of the present application.

The invention claimed is:

1. A case for a battery comprising:
a first case body provided with an opening;
an accommodating groove provided in a peripheral direction of the opening;
a sealant accommodated in the accommodating groove;
a holder arranged in the first case body wherein an inner peripheral wall of the first case body and the holder jointly define the accommodating groove;
a first locking member via which the holder is connected to the first case body; and
a second case body provided with a peripherally-arranged joint part wherein the joint part extends into the accommodating groove and is joined with the sealant,
wherein the second case body covers the opening so as to form a sealed connection between the first case body and the second case body,
wherein the holder comprises a stepped surface formed between a first peripheral surface and a second peripheral surface wherein the stepped surface is a bottom wall of the accommodating groove
wherein the joint part is provided with a notch for avoiding the first locking member and sealant completely covers the notch.

2. The case according to claim 1, wherein the joint part is configured to extend into the accommodating groove and be inserted into the sealant such that the joint part is joined with the sealant.

3. The case according to claim 1, wherein the accommodating groove is located on an inner side of the first case body.

4. The case according to claim 1, wherein the holder is provided with a limiting portion and the limiting portion is configured to abut against a battery unit located in the first case body to limit a movement of the battery unit in a direction approaching the second case body.

5. The case according to claim 1, wherein the holder is integrally formed with the first case body or the holder is separate from the first case body.

6. The case according to claim 1, wherein the first case body is provided with a first mounting hole and the holder is provided with a second mounting hole and the first locking member sequentially passes through the first mounting hole, the sealant, and the second mounting hole to connect the holder to the first case body.

7. The case according to claim 1, wherein an outer peripheral wall of the holder comprises: the first peripheral surface attached to the inner peripheral wall of the first case body and the second peripheral surface arranged spaced apart from the inner peripheral wall of the first case body wherein the second peripheral surface is one side wall of the accommodating groove and the inner peripheral wall of the first case body is the other side wall of the accommodating groove.

8. The case according to claim 1, further comprising a second locking member via which the second case body is connected to the first case body.

9. The case according to claim 8, wherein the first case body is provided with a third mounting hole and the second case body is provided with a fourth mounting hole and the second locking member sequentially passes through the third mounting hole and the fourth mounting hole to connect the first case body to the second case body wherein the third mounting hole is closer to the opening than the sealant.

10. A battery comprising:

a case according to claim 1; and a battery unit accommodated in a sealed space defined by the first case body and the second case body.

11. A power consuming device, comprising a battery according to claim 10 and the device.

\* \* \* \* \*